May 20, 1969   C. T. FRIZELL   3,444,776
ELASTIC-LATCHING SPACER FOR ROLL-FORMING MACHINES AND THE LIKE
Filed Aug. 23, 1967

Inventor
CHARLES T. FRIZELL
By Jerome A. Gross
Attorney

United States Patent Office 3,444,776
Patented May 20, 1969

3,444,776
ELASTIC-LATCHING SPACER FOR ROLL-FORM-ING MACHINES AND THE LIKE
Charles T. Frizell, St. Louis, Mo., assignor to Engel Equipment, Inc., St. Louis, Mo., a corporation of Missouri
Filed Aug. 23, 1967, Ser. No. 662,673
Int. Cl. F16b *43/00;* F16c *17/02, 19/04*
U.S. Cl. 85—51                                    3 Claims

ABSTRACT OF THE DISCLOSURE

For that type of roll-forming machine in which roll elements have alternate positions, C-shaped elastic-latching spacers are provided, for quick securement and detachment from the shafts. In the wall of the entrant slot adjacent to the inner semi-cylindrical surface of the spacer is a groove, holding an inward-projecting key of rubber-like material. Its resistance to compression causes the spacer to hold more than 180° around the shaft, resisting shock and vibration.

Background of the invention

Roll-forming machines used in fabricating sheet metal ducts may include separable roll elements, to form some part of the duct seam to an alternate greater or lesser dimension. It is convenient to provide for sliding such a roll element a fixed distance along its shaft, and to fix it axially in either position by applying to the shafts at either side of the slidable element, a fixed width spacer. However when a sheet metal workpiece passes through the machine, it causes jolting as its ends pass every forming station; therefore such spacers must hold securely to the shafts.

Washer-like spacers could not be used for this purpose, for they would require disassembly of the roll shafts from the machine. C-shaped spacers of the type shown in Great Britain Patent No. 957,307 are likewise unsuitable; they are intended to be assembled on a shaft and locked in axial position by an axial force, which could not be applied in such a machine. If a C-shaped spacer was force-fitted on a shaft with sufficient tightness to resist the jolting vibrations, it could not be readily removed and replaced.

Summary of the invention

The present invention comprises providing a generally C-shaped spacer with an elastic latch which resists vibration.

The hardened metal body of the spacer has two parallel side surfaces, spaced apart to establish the desired spacing; and an outer edge surface which is preferably rounded to permit use between roll elements. An entrant slot leads inward from the outer edge surface and terminates in an inner semi-cylindrical surface formed about an axis perpendicular to the side surfaces.

In the wall of the entrant slot, closely adjacent to the point at which it merges with the semi-cylindrical surface, is a recess; preferably a groove parallel to the axis. Lodged in it, and projecting outward into the slot is what is in effect a latching key, formed of compressible rubber-like material, such as a rubber-like plastic, of a type unaffected by oil or grease. The distance which the material normally projects brings it closer to the axis than one radius of the semi-cylindrical surface.

The spacer may be fitted onto a shaft by passing the slot over the shaft and compressing the latching material into the recess. As the semi-cylindrical portion contacts the shaft, the resistance of the latching material to compression causes it to spring back and hold against the shaft in a position which extends the hold of the spacer on the shaft to more than 180°.

Description of the preferred embodiment

Figure 1:
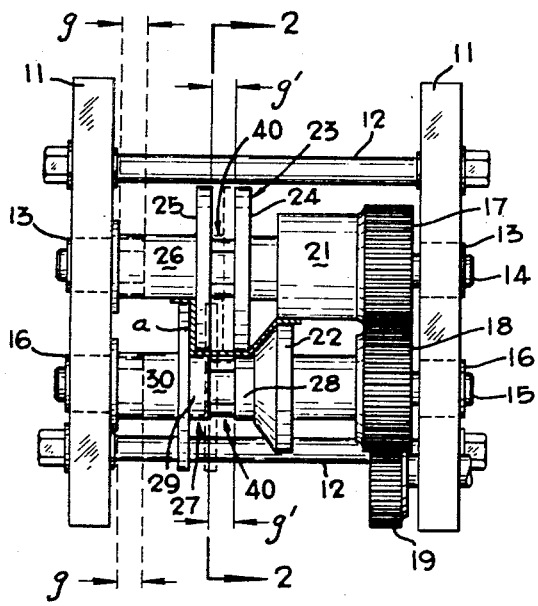
FIG. 1 is a view, partly schematic, of the type of a roll former machine utilizing the spacer of the machine on the upper and lower shafts.

A type of roll former machine for use with which the present spacer is especially well adapted, is shown in FIG. 1. Side frames 11 are secured in parallel alignment by upper and lower spacing bolts 12. Aligned upper bearings 13 in the frames 11 carry upper shafts 14, one of which is shown in FIG. 1, it being understood that this illustrates merely one forming station. A lower roll shaft 15 is held parallel to the upper shaft 14 in bearing 16. The shafts 14, 15 have upper and lower gears 17, 18 keyed thereto and in mesh with each other and with a driving gear 19 which makes up part of a power train.

On the upper shaft 14, adjacent to its gear 17 is a fixed roll element 21, designed for forming with a fixed roll element 22 on the lower shaft 15. Adjacent to the fixed roll element 21 on the upper shaft 14 is a separable or two-part upper roll element generally designated 23, consisting of a fixed part 24 and a slidable part 25, the latter having at its left side an integral sliding sleeve 26. A lower separable roll element generally designated 27 having its right hand element 28 fixed to the shaft and its left hand element 29, including an integral sleeve 30 slidable along the lower shaft 15.

A spacer embodying the present invention generally designated 40 is shown on both the upper and the lower shaft 14, 15, in position between the roll elements 23, 27, that is at the right side of the slidable part 25 and left hand element 29. The spacer 40 is generally disc-like, as will be hereafter more fully described and its outer diameter is sufficiently small, as shown in the lower parts of FIGS. 1 and 2, as to be less than the diameter of the forming portions of the separable lower roll parts 28, 29 when in position therebetween as shown in the lower portion of FIG. 1. Thus they do not interfere with the forming of a sheet metal workpiece *a* passing therethrough as illustrated.

If the spacers 40 be removed from the upper and lower shafts 14, 15 the slidable part 25 with its integral sliding sleeve 26 and the left hand element 29 with its integral sleeve 30 may be slid to the right, so that the roll elements 23, 27 becomes in effect a narrower roll element. On so doing, a gap illustrated by the space *g* of FIG. 1 will be opened adjacent to the bearings 13, 16 in the left frame. The spacers 40 may then be replaced on the shafts 14, 15 in the gap *g*.

In the foregoing environment the utility of the present invention will be apparent. The spacer 40 is designed for quick securement onto and detachment from shafts 14, 15, either in the position shown or in the gap *g*, adjacent to the left frame bearings 13, as shown in phantom. In the positions shown in solid lines in FIG. 1, the spacer width, between its parallel side surfaces 41, 42 separates the slidable roll parts 25, 29, from their respective fixed roll parts 24, 28, by a distance *g'* equal to the gap *g*.

Figure 2:
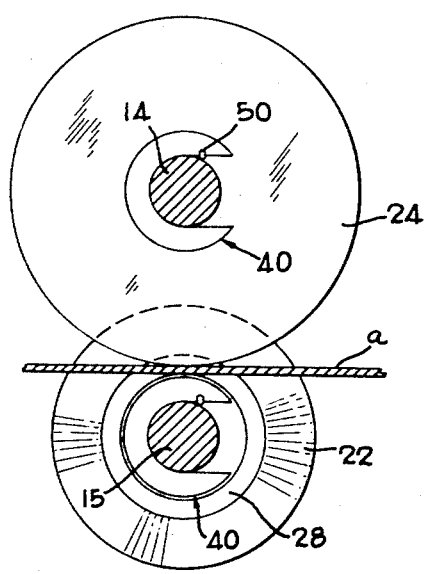
FIG. 2 is an enlarged fragmentary cross-section taken along line 2—2 of FIG. 1.

The spacer 40 is a body of hard metal, preferably hardened steel, whose side surfaces 41, 42 are carefully machined, and whose outer edge surface 43 is preferably cylindrical, formed to a radius less than the radius of the smaller mating roll elements 27, 28 as shown in the lower portion of FIGS. 1 and 2.

To fix the spacer 40 on the shafts 14, 15, it is provided with an entrant slot having parallel walls 45 perpendicular to the side surfaces 41, 42, leading inwardly from the outer edge surface 43, and terminating in an inner semi-cylindrical surface 46. The semi-cylindrical surface 46 is formed about an axis $b$ which is perpendicular to the side surfaces 41, 42. The radius at which the semi-cylindrical surface 46 is formed is very slightly greater than the radius of the shafts 14, 15, so that the spacer 40 may be applied onto and removed from the shafts 14, 15 without force-fitting, to present the semi-cylindrical surface 46 presented in close contact thereagainst.

Figure 3:
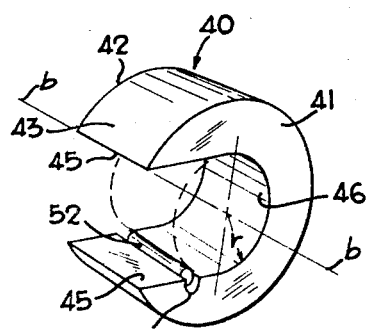
FIG. 3 is an enlarged perspective view of one of the spacers shown in FIG. 2.

In a wall 45 of the entrant slot closely adjacent to the point where a slot 45 merges into the semi-cylindrical surface 46, a recess 50 is formed. In the embodiment illustrated the recess is a groove parallel to the axis $b$ of arcuate configuration and formed about a center slightly below the surface of the slot wall 45 as shown in FIG. 3.

Lodged within the recess 50 and normally projecting outward therefrom, beyond the wall 45 and into the entrant slot, is a piece of elastically compressible latching material 52, preferably rubber-like plastic or imitation rubber which does not deteriorate on contact with oil or grease. In the preferred embodiment, the material 52 is a solid cylindrical key whose length is slightly less than the spacing of the side surfaces 41, 42. The key 52 may be conveniently cut from round rubber-like material whose radius permits it to be lodged securely within the recess 50. It projects beyond the entrant slot wall 45 such a distance as to bring its projecting surface closer to the axis $b$ than the radius $r$ of the semi-cylindrical surface 46, as shown in FIG. 3.

In applying the spacer 40, when the rubber-like latching material 52 passes over one of the shafts 14, 15, it is compressed downward into the recess 50. Solid rubber-like material, when compressed in one dimension, must expand somewhat in another. Such expansion is permitted by the short length of the latching key 52 as compared to the length of the groove 50.

Once in place on the shaft, the resistance of the elastic latching material 52 to compression causes it to grasp firmly onto a shaft. Since the semi-cylindrical surface 46 itself presents substantially 180° of contact against the shaft 14, 15, the latching key 52 extends the grasp of the spacer 40 so that it holds around the shaft over an angular distance which totals greater than 180°, being thus securely latched.

On removing the spacer from the position shown in FIG. 2, when the shaft 14, 15 passes over the key 52, it again compresses it in the recess 50.

So positive is the latching force that the spacer 40 may readily be applied and removed by hand, without special tools. The elastic latching resists the severe vibrations to which roll forming equipment is subjected to at each roll station when a workpiece first enters between the roll elements 23, 27 and then passes outwardly therefrom. For ease of application and removal, as well as for vibration resistance, the present invention is significantly more advantageous than force-fitted keys.

Modifications of the present invention will occur to those familiar with the problems of the art.

I claim:
1. An elastic-latching, vibration-resisting spacer for quick securement onto and detachment from shafts of roll forming machines and the like without force fitting, comprising,
   a hard metal body having two parallel spaced-apart side surfaces and an outer edge surface, and
   an entrant slot having parallel walls perpendicular to said side surfaces and leading inward from the outer edge surface and terminating in an inner semi-cylindrical surface formed about an axis perpendicular to said side surfaces,
characterized in having
   a groove formed parallel to said axis in a wall of the entrant slot closely adjacent to the semi-cylindrical surface, and
   an elongated rubber-like key lodged lengthwise in said groove and normally projecting outward therefrom into the slot such distance as to position a portion of its surface closer to the axis than one radius of the semi-cylindrical surface,
whereby compressing said rubber-like key permits fitting the spacer onto a shaft and its resistance to compression causes the spacer to hold around the circumference of such shaft an angular distance greater than 180°.

2. A spacer as defined in claim 1, wherein
said rubber-like key is solid and its length is less than the length of the groove.

3. A spacer as defined in claim 1, wherein
the groove is arcuate and formed about a center slightly below the slot wall surface, and
the rubber-like key therein is cylindrical.

References Cited

UNITED STATES PATENTS

| | | | |
|---|---|---|---|
| 1,280,813 | 10/1918 | Mueller et al. | 85—51 |
| 1,662,940 | 3/1928 | Sievern | 24—236 |
| 2,244,818 | 6/1941 | Woodruff | 85—51 |
| 2,418,095 | 3/1947 | Riblet | 85—51 |

FOREIGN PATENTS 860,124  2/1961  Great Britain.

EDWARD C. ALLEN, *Primary Examiner.*

U.S. Cl. X.R.

308—37